US012257859B1

(12) United States Patent
Peng

(10) Patent No.: US 12,257,859 B1
(45) Date of Patent: Mar. 25, 2025

(54) ELECTRIC VEHICLE MOTOR WITH DOUBLE DISC BRAKES

(71) Applicant: Chunyan Luo, Shenzhen (CN)

(72) Inventor: Guangwen Peng, Baojing (CN)

(73) Assignee: Chunyan Luo, Shenzhen (CN)

( * ) Notice: Subject to any disclaimer, the term of this patent is extended or adjusted under 35 U.S.C. 154(b) by 0 days.

(21) Appl. No.: 18/967,315

(22) Filed: Dec. 3, 2024

(30) Foreign Application Priority Data

Nov. 22, 2024 (CN) .......................... 202422869828.2

(51) Int. Cl.
H02K 7/00 (2006.01)
B32B 5/02 (2006.01)
(Continued)

(52) U.S. Cl.
CPC ............... *B60B 21/08* (2013.01); *B32B 5/02* (2013.01); *B32B 9/005* (2013.01); *B32B 9/047* (2013.01); *B62L 1/005* (2013.01); *B62M 6/65* (2013.01); *F16D 55/025* (2013.01); *F16D 65/123* (2013.01); *F16D 65/126* (2013.01); *B32B 2260/021* (2013.01); *B32B 2260/046* (2013.01); *B32B 2262/106* (2013.01); *B32B 2307/212* (2013.01); *B32B 2307/304* (2013.01); *B32B 2605/00* (2013.01); *B60B 2360/32* (2013.01); *B60B 2360/3416* (2013.01); *B60B 2360/70* (2013.01); *B60B 2900/111* (2013.01); *B60B 2900/513* (2013.01); *B60K 2007/0092* (2013.01); *F16D 2065/1308* (2013.01);
(Continued)

(58) Field of Classification Search
CPC ............... B60B 21/08; B60B 2360/32; B60B 2360/3416; B60B 2360/70; B60B 2900/111; B60B 2900/513; B32B 5/02; B32B 9/005; B32B 9/047; B32B 2260/021; B32B 2260/046; B32B 2262/106; B32B 2307/212; B32B 2307/304; B32B 2605/00; B62L 1/005; B62M 6/65; F16D 55/025; F16D 65/123; F16D 65/126; F16D 2065/1308; F16D 2065/138; F16D 2065/1392
USPC ............ 180/65.1; 301/6.5, 6.8; 310/112, 114
See application file for complete search history.

(56) References Cited

U.S. PATENT DOCUMENTS

2005/0140230 A1* 6/2005 Johnson ................. H02K 29/10
903/917
2014/0312723 A1 10/2014 Yamaguchi et al.
(Continued)

FOREIGN PATENT DOCUMENTS

CN 105620264 B * 1/2018 ............... B60K 6/26
CN 114337078 B * 9/2023 ............... H02K 7/00

*Primary Examiner* — Christopher P Schwartz

(57) ABSTRACT

An electric vehicle motor with double disc brakes is provided, and relates to the field of electric vehicle motors. The electric vehicle motor includes a first disc brake, a motor body, fixed bolts and a second disc brake. A wheel rim is fixedly arranged on an outer surface of the electric vehicle motor. An upper shell is fixedly arranged at an upper end of the wheel rim, and a lower shell is fixedly arranged at a lower end of the wheel rim. The problem of braking may be well solved through double disc brakes, and traffic accidents due to poor braking of the electric vehicle at high speed, in long-time downhill periods or on rainy days may be effectively solved. Moreover, the first disc brake and the second disc brake are both made of aluminum alloy materials.

7 Claims, 4 Drawing Sheets

(51) Int. Cl.
  *B32B 9/00* (2006.01)
  *B32B 9/04* (2006.01)
  *B60B 21/08* (2006.01)
  *B62L 1/00* (2006.01)
  *B62M 6/65* (2010.01)
  *F16D 55/02* (2006.01)
  *F16D 65/12* (2006.01)
  *B60K 7/00* (2006.01)
  *F16D 65/02* (2006.01)

(52) U.S. Cl.
  CPC ............... *F16D 2065/138* (2013.01); *F16D 2065/1392* (2013.01); *F16D 2200/003* (2013.01)

(56) References Cited

U.S. PATENT DOCUMENTS

| | | |
|---|---|---|
| 2020/0153310 A1 | 5/2020 | Takeno et al. |
| 2022/0294310 A1 | 9/2022 | Vianello |
| 2023/0261539 A1* | 8/2023 | Chung .................... H02K 5/10 310/67 R |

* cited by examiner

ELECTRIC VEHICLE MOTOR WITH DOUBLE DISC BRAKES

TECHNICAL FIELD

The present disclosure relates to the field of electric vehicle motors, in particular to an electric vehicle motor with double disc brakes.

BACKGROUND

The electric vehicle motor is one of core components of an electric vehicle. The main function is to convert electric energy into mechanical energy, so that the electric vehicle is driven to run. The electric vehicle motor usually consists of two parts including a stator and a rotor. The stator is provided with a winding, and a magnetic field is produced when current is introduced. The rotor rotates under the action of the magnetic field. The electric vehicle motor has the advantages of high efficiency, energy saving and environmental protection.

In the existing electric vehicle motor, the motor of an electric bicycle motor is provided with a single-sided disc brake. The braking effect is poor in long-time downhill periods or on rainy days, and it is easy to cause traffic accidents due to poor braking under the condition of high speed. Therefore, an electric vehicle motor with double disc brakes is provided by those skilled in the art so as to solve the problems mentioned in the background art.

SUMMARY

In order to solve the disadvantages existing in the prior art, the present disclosure provides an electric vehicle motor with double disc brakes. The electric vehicle motor may ensure the safety of the electric vehicle during cycling.

To achieve the above purpose, the present disclosure provides the following technical scheme.

An electric vehicle motor with double disc brakes includes a first disc brake, a motor body, fixed bolts and a second disc brake. A wheel rim is fixedly arranged on an outer surface of the electric vehicle motor. An upper shell is fixedly arranged at an upper end of the wheel rim, and a lower shell is fixedly arranged at a lower end of the wheel rim.

The upper shell, the wheel rim and the lower shell all include a base layer. A first reinforced layer is fixedly arranged on an outer surface of the base layer, and a second reinforced layer is fixedly arranged on an outer surface of the first reinforced layer.

Further, the first disc brake is fixedly arranged at an upper end of the upper shell through the fixed bolts, and the second disc brake is fixedly arranged at an upper end of the lower shell through the fixed bolts.

Further, motor center shafts are fixedly arranged at output ends on both sides of the motor body.

Further, limit caps are arranged on outer surfaces of the two motor center shafts through threads.

Further, the first disc brake and the second disc brake are both made of aluminum alloy materials.

Further, the base layer is made of carbon fiber materials, and the first reinforced layer is made of polyimide films.

Further, the second reinforced layer is made of ceramic insulating materials.

The present disclosure has the following beneficial effects.

Firstly, according to an electric vehicle motor with double disc brakes provided by the present disclosure, compared with the existing electric bicycle motor with a single-sided disc brake, the braking effect is poor in long-time downhill periods or on rainy days, and it is easy to cause traffic accidents due to poor braking under the condition of high speed. The electric vehicle motor is provided with a first disc brake and a second disc brake. The problem of braking may be well solved through double disc brakes, and traffic accidents due to poor braking of the electric vehicle at high speed, in long-time downhill periods or on rainy days may be effectively solved. Moreover, the first disc brake and the second disc brake are both made of aluminum alloy materials since the aluminum alloy materials are excellent in heat dissipation performance and may quickly dissipate heat generated by friction in the braking process to prevent the brake pads from overheating to cause decline in braking effect. Meanwhile, low weight is also beneficial to reducing the overall load of the vehicle to improve the control performance of the vehicle.

Secondly, according to an electric vehicle motor with double disc brakes provided by the present disclosure, compared with the existing electric bicycle motor in which 36-hole spokes are easy to fracture when in use to cause accidents, the 36-hole spokes are changed into 72-hole spokes, and the number of the spokes is increased, so that the fracture risk is reduced, and the cycling safety is guaranteed. Moreover, the upper shell, the wheel rim and the lower shell are designed through the base layer, the first reinforced layer and the second reinforced layer. The base layer is made of carbon fiber materials. The materials have the characteristics of high strength and low density, and may provide a firm structure for the whole shell, so that external shocks and pressure may be effectively resisted. The first reinforced layer is made of polyimide films, so that the flexibility and tensile resistance of the shell are further enhanced, and high structural integrity may be kept under different working conditions. The second reinforced layer is made of ceramic insulating materials, so that the motor may be prevented from electromagnetically interfering with other components, and the high temperature resistance of the shell is also promoted to ensure that the upper shell, the wheel rim, the lower shell and other components may still operate normally under high temperature environments when the motor operates and during braking.

Figure 1:
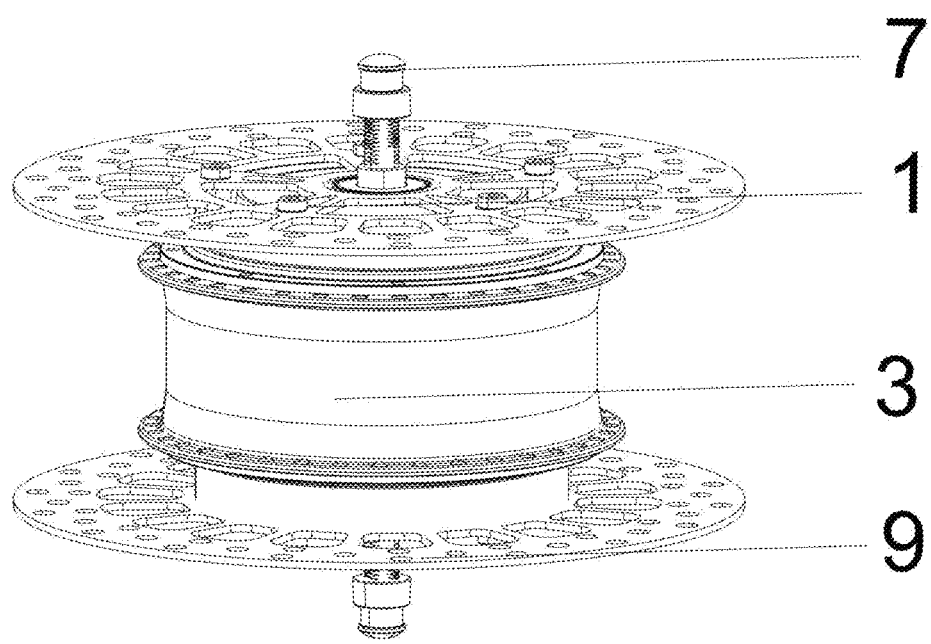
FIG. 1 is an axonometric schematic diagram of the present disclosure.

Reference signs in the attached figures:
1, first disc brake; 2, upper shell; 3, wheel rim; 4, motor center shaft; 5, motor body; 6, fixed bolt; 7, limit cap; 8, lower shell; 9, second disc brake; 10, base layer; 11, first reinforced layer; and 12, second reinforced layer.

DETAILED DESCRIPTION OF THE EMBODIMENTS

The technical schemes according to embodiments of the present disclosure are clearly and completely described in the following with reference to the attached figures in the present disclosure. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Referring to FIG. 1 to FIG. 4, in an embodiment provided by the present disclosure, an electric vehicle motor with double disc brakes includes a first disc brake 1, a motor body 5, fixed bolts 6 and a second disc brake 9. A wheel rim 3 is fixedly arranged on an outer surface of the electric vehicle motor 5. An upper shell 2 is fixedly arranged at an upper end of the wheel rim 3, and a lower shell 8 is fixedly arranged at a lower end of the wheel rim 3. The upper shell 2, the wheel rim 3 and the lower shell 8 all include a base layer 10. A first reinforced layer 11 is fixedly arranged on an outer surface of the base layer 10, and a second reinforced layer 12 is fixedly arranged on an outer surface of the first reinforced layer 11. The base layer 10 is made of carbon fiber materials, and the first reinforced layer 11 is made of polyimide films. The second reinforced layer 12 is made of ceramic insulating materials. The first disc brake 1 and the second disc brake 9 are both made of aluminum alloy materials.

Specifically, for the existing electric bicycle, the electric bicycle motor is provided with a single-sided disc brake, the braking effect is poor in long-time downhill periods or on rainy days, and it is easy to cause traffic accidents due to poor braking under the condition of high speed. The electric vehicle motor is provided with a first disc brake 1 and a second disc brake 9. The problem of braking may be well solved through double disc brakes, and traffic accidents due to poor braking of the electric vehicle at high speed, in long-time downhill periods or on rainy days may be effectively solved. Moreover, the first disc brake 1 and the second disc brake 9 are both made of aluminum alloy materials since the aluminum alloy materials are excellent in heat dissipation performance and may quickly dissipate heat generated by friction in the braking process to prevent brake pads from overheating to cause decline in braking effect. Meanwhile, low weight is also beneficial to reducing the overall load of the vehicle to improve the control performance of the vehicle. Moreover, the upper shell 2, the wheel rim 3 and the lower shell 8 are designed through the base layer 10, the first reinforced layer 11 and the second reinforced layer 12. The base layer 10 is made of carbon fiber materials. The materials have the characteristics of high strength and low density, and provides a firm infrastructure for the whole shell, so that external shocks and pressure may be effectively resisted. The first reinforced layer 11 is made of polyimide films, so that the flexibility and tensile resistance of the shell are further enhanced, and high structural integrity may be kept under different working conditions. The second reinforced layer 12 is made of ceramic insulating materials, so that the influence of electromagnetic interference generated by the motor on other components may be effectively prevented. Meanwhile, the high temperature resistance of the shell is also promoted to ensure that the upper shell 2, the wheel rim 3 and the lower shell 8 may still operate normally under high temperature environments when the motor operates to produce heat and during braking, so that the safety of the motor and other components is guaranteed. Moreover, in the present disclosure, the number of motor spokes is increased, 36-hole spokes are changed into 72-hole spokes, it is not easy to lead to spoke fracture since the number of motor spoke is increased, so that the cycling safety of the electric vehicle is stabilized.

Figure 2:
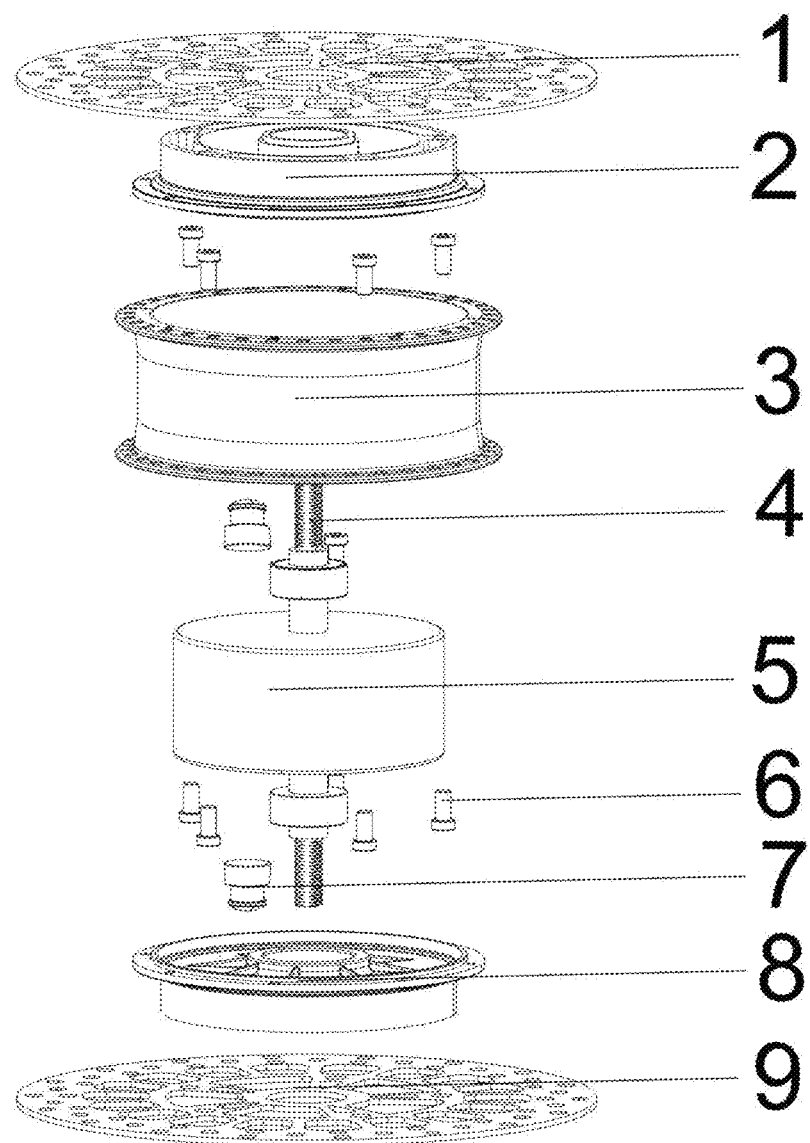
FIG. 2 is a dilatation axis side schematic diagram of the present disclosure.
Figure 3:
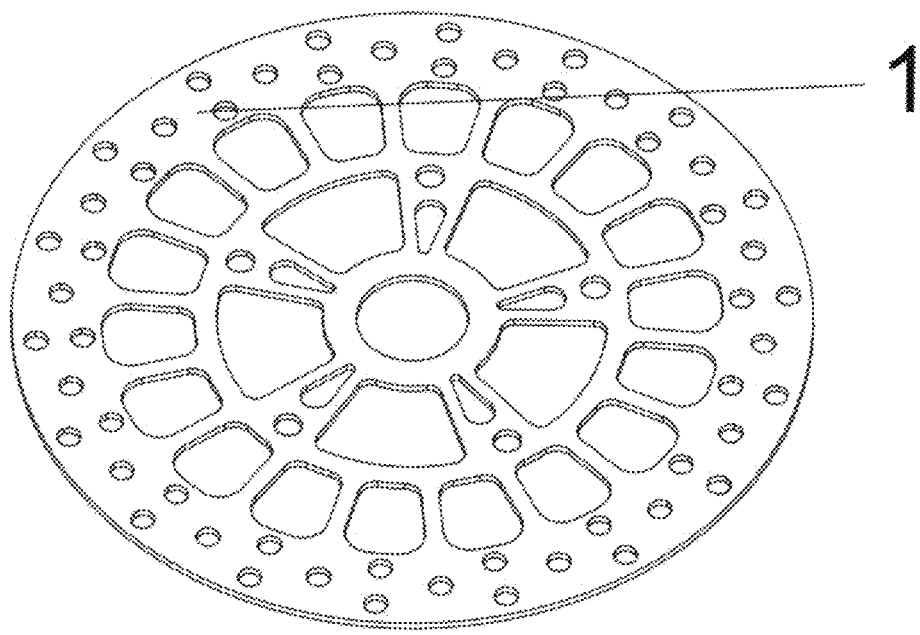
FIG. 3 is a structural schematic diagram of a first disc brake in the present disclosure.
Figure 4:
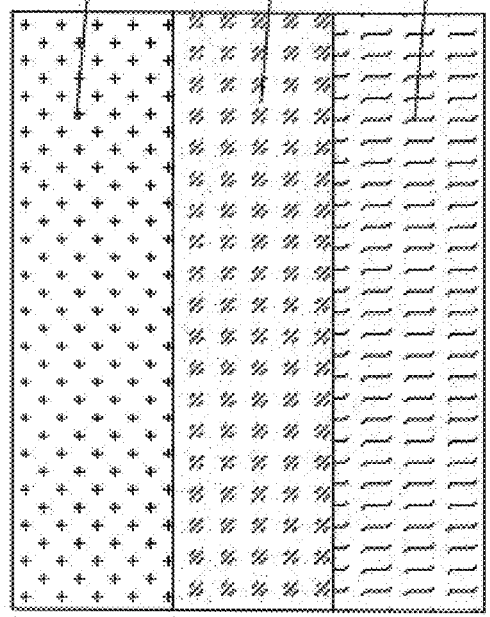
FIG. 4 is a structural schematic diagram of an upper housing, a lower housing and a wheel rim in the present disclosure.

Referring to FIG. 1 and FIG. 2, the first disc brake 1 is fixedly arranged at an upper end of the upper shell 2 through the fixed bolts 6, and the second disc brake 9 is fixedly arranged at an upper end of the lower shell 8 through the fixed bolts 6. Motor center shafts 4 are fixedly arranged at output ends on both sides of the motor body 5. Limit caps 7 are arranged on outer surfaces of the two motor center shafts 4 through threads.

Specifically, the first disc brake 1 is fixedly arranged at the upper end of the upper shell 2 through the fixed bolts 6, and the second disc brake 9 is fixedly arranged at the upper end of the lower shell 8 through the same fixed bolts 6. The position and installation method are well-designed to ensure that the disc brakes may accurately make contact with the wheel rim 3 during braking to produce enough frictional force. The first disc brake 1 and the second disc brake 9 are of symmetric layout, and jointly provide stable and strong braking force for the vehicle. The motor center shafts 4 are fixedly arranged at output ends on both sides of the motor body 5. The motor center shafts 4 are taken as core components for power transmission. The balance is kept by controlling the position of the mass center of a rotating part of the motor. The limit caps 7 are arranged on outer surfaces of the two motor center shafts 4 through threads. The limit caps 7 are made of nylon materials, and are of certain elasticity and abrasion performance. During the operation process of the motor, the limit caps 7 may effectively prevent the motor center shafts 4 from axially floating to ensure stable operation of the motor and avoid motor faults and potential safety hazards caused by center shaft displacement.

The working principle is as follows. The problem of braking may be well solved through double disc brakes when the electric vehicle motor is used. Traffic accidents due to poor braking of the electric vehicle at high speed, in long-time downhill periods or on rainy days may be effectively solved. Moreover, the first disc brake 1 and the second disc brake 9 are both made of aluminum alloy materials since the aluminum alloy materials are excellent in heat dissipation performance and may quickly dissipate heat generated by friction in the braking process to prevent the brake pads from overheating to cause decline in braking effect. Meanwhile, low weight is also beneficial to reducing the overall load of the vehicle to improve the control performance of the vehicle. The upper shell 2, the wheel rim 3 and the lower shell 8 are designed through the base layer 10, the first reinforced layer 11 and the second reinforced layer 12. The base layer 10 is made of carbon fiber materials. The first reinforced layer 11 is made of polyimide films. The second reinforced layer 12 is made of ceramic insulating materials, so that the influence of electromagnetic interference generated by the motor on other components may be effectively prevented. Meanwhile, the high temperature resistance of the shell is also promoted to ensure that the upper shell 2, the wheel rim 3 and the lower shell 8 may still operate normally under high temperature environments when the motor operates to produce heat and during braking, so that the safety of the motor and other components is guaranteed.

Finally, it should be noted that the above description is merely a preferred example of the present disclosure and is not intended to limit the present disclosure. Although the present disclosure is described in detail with reference to the foregoing embodiments, those skilled in the art should understand that they may still make modifications to the technical schemes described in the foregoing embodiments or make equivalent replacements to some technical features thereof. Any modification, equivalent replacement, or improvement made without departing from the spirit and principle of the present disclosure shall fall within the protection scope of the present disclosure.

What is claimed is:

1. An electric vehicle motor with double disc brakes, comprising a first disc brake (1), a motor body (5), fixed bolts (6) and a second disc brake (9), wherein a wheel rim (3) is fixedly arranged on an outer surface of the electric vehicle motor (5), an upper shell (2) is fixedly arranged at an upper end of the wheel rim (3), and a lower shell (8) is fixedly arranged at a lower end of the wheel rim (3);

the upper shell (2), the wheel rim (3) and the lower shell (8) all comprise a base layer (10), a first reinforced layer (11) is fixedly arranged on an outer surface of the base layer (10), and a second reinforced layer (12) is fixedly arranged on an outer surface of the first reinforced layer (11).

2. The electric vehicle motor with double disc brakes according to claim 1, wherein the first disc brake (1) is fixedly arranged at an upper end of the upper shell (2) through the fixed bolts (6), and the second disc brake (9) is fixedly arranged at an upper end of the lower shell (8) through the fixed bolts (6).

3. The electric vehicle motor with double disc brakes according to claim 1, wherein motor center shafts (4) are fixedly arranged at output ends on both sides of the motor body (5).

4. The electric vehicle motor with double disc brakes according to claim 3, wherein limit caps (7) are arranged on outer surfaces of the two motor center shafts (4) through threads.

5. The electric vehicle motor with double disc brakes according to claim 1, wherein the first disc brake (1) and the second disc brake (9) are both made of aluminum alloy materials.

6. The electric vehicle motor with double disc brakes according to claim 1, wherein the base layer (10) is made of carbon fiber materials, and the first reinforced layer (11) is made of polyimide films.

7. The electric vehicle motor with double disc brakes according to claim 1, wherein the second reinforced layer (12) is made of ceramic insulating materials.

* * * * *